United States Patent
Engelhardt et al.

(10) Patent No.: US 11,073,677 B2
(45) Date of Patent: Jul. 27, 2021

(54) ATHERMAL OPTICAL ASSEMBLY

(71) Applicant: ams Sensors Singapore Pte. Ltd., Singapore (SG)

(72) Inventors: Kai Engelhardt, Buckenhof (DE); Markus Rossi, Jona (CH)

(73) Assignee: ams Sensors Singapore Pte. Ltd., Singapore (SG)

( * ) Notice: Subject to any disclaimer, the term of this patent is extended or adjusted under 35 U.S.C. 154(b) by 232 days.

(21) Appl. No.: 15/769,916

(22) PCT Filed: Oct. 21, 2016

(86) PCT No.: PCT/SG2016/050512
§ 371 (c)(1),
(2) Date: Apr. 20, 2018

(87) PCT Pub. No.: WO2017/069705
PCT Pub. Date: Apr. 27, 2017

(65) Prior Publication Data
US 2020/0064584 A1 Feb. 27, 2020

Related U.S. Application Data (60) Provisional application No. 62/245,082, filed on Oct. 22, 2015.

(51) Int. Cl.
*G02B 7/02* (2006.01)
*G02B 27/00* (2006.01)
(Continued)

(52) U.S. Cl.
CPC ............. *G02B 7/028* (2013.01); *G02B 7/008* (2013.01); *G02B 13/18* (2013.01);
(Continued)

(58) Field of Classification Search
CPC .... G02B 13/18; G02B 7/028; G02B 27/0056; G02B 27/4211; G02B 27/0037; G02B 7/008; G02B 27/4233; G02B 4/008
(Continued)

(56) References Cited

U.S. PATENT DOCUMENTS 5,745,289 A 4/1998 Hamblen
6,154,323 A 11/2000 Kamo
(Continued)

FOREIGN PATENT DOCUMENTS

CN 1455282 A 11/2003
EP 2 453 267 A1 5/2012
(Continued)

OTHER PUBLICATIONS

ISA/AU, International Search Report for PCT/SG2016/05052 (dated Dec. 20, 2016).
(Continued)

*Primary Examiner* — Kristina M Deherrera
(74) *Attorney, Agent, or Firm* — Michael Best & Friedrich LLP (57) ABSTRACT

This disclosure describes optical assemblies that generate output with substantial stability over a wide variation in temperature. The optical assemblies can be integrated, for example, as part of array generators arranged to project an array or other pattern of dots onto an object or projection plane.

12 Claims, 7 Drawing Sheets

(51) Int. Cl.
*G02B 13/18* (2006.01)
*G02B 27/42* (2006.01)
*G02B 7/00* (2021.01)

(52) U.S. Cl.
CPC ..... *G02B 27/0037* (2013.01); *G02B 27/0056* (2013.01); *G02B 27/4211* (2013.01); *G02B 27/4233* (2013.01)

(58) Field of Classification Search
USPC .......................................................... 359/558
See application file for complete search history.

(56) References Cited

U.S. PATENT DOCUMENTS

| | | | |
|---|---|---|---|
| 6,262,844 | B1 | 7/2001 | Soskind |
| 7,221,513 | B2 | 5/2007 | Cho et al. |
| 2002/0089763 | A1 | 7/2002 | Takeuchi et al. |
| 2003/0043463 | A1 | 3/2003 | Li et al. |
| 2006/0262416 | A1* | 11/2006 | Lee ................... G02B 27/4211 359/645 |
| 2009/0015933 | A1* | 1/2009 | Choi ................... G02B 27/0037 359/649 |
| 2010/0214656 | A1 | 8/2010 | Janik |
| 2011/0032409 | A1 | 2/2011 | Rossi et al. |
| 2012/0183288 | A1 | 7/2012 | Kishinami et al. |
| 2012/0206641 | A1 | 8/2012 | Baba |
| 2015/0036046 | A1 | 2/2015 | Rudmann et al. |

FOREIGN PATENT DOCUMENTS

| | | |
|---|---|---|
| GB | 2246876 | 2/1992 |
| JP | 2002350973 A | 12/2002 |
| JP | 2004126393 A | 4/2004 |
| JP | 2008077728 A | 4/2008 |

OTHER PUBLICATIONS

Behrmann, et al., "A Hybrid Approach Opens Doors for Diffractive Optics," Photonics Spectra, May 1993.
Behrmann et al., "Hybrid (Refractive/Diffractive) Optics," (Chapter 10).
English Translation of Office Action issued from the Taiwan Patent Office for related Application No. 105134196 dated Jan. 6, 2020 (5 pages).
English Translation of Office Action issued from the Japan Patent Office for related Application No. 2018-520581 dated Feb. 4, 2020 (4 pages).
English Translation of Notice of Grounds of Rejection issued from the Japan Patent Office for related Application No. 2018-520581 dated Sep. 29, 2020 (3 pages).

* cited by examiner

ATHERMAL OPTICAL ASSEMBLY

TECHNICAL FIELD

This disclosure relates to optical assemblies.

BACKGROUND

Optical assemblies are used in a wide range of commercial, industrial and military devices and systems. The assemblies may include, for example, various types of passive optical elements such as diffractive, refractive or reflective components. For some applications, hybrid optical elements can be advantageous. A hybrid optical element can have a diffractive surface that is etched, micro-machined or embossed, for example, onto the surface of a refractive or reflective optical component. Such hybrid elements can, in some cases, provide enhanced flexibility in the selection of materials based, for example, on dispersion and thermal behavior of the refractive materials.

Depending on the application, various factors such as temperature variations may adversely impact the performance of the optical assembly. For example, in some situations, an optical assembly may be integrated into an optoelectronic module that also includes a light emitting element such as a vertical cavity surface-emitting laser (VCSEL) operable to emit infra-red (IR) radiation. Operation of the VCSEL in close proximity to the optical assembly may result in thermally-induced changes to the optical elements of the assembly. For example, if the optical assembly includes polymeric lenses, changes in temperature may result in changes to the dimensions and/or the refractive index of the lenses. Such changes can, in turn, cause the output of the optical assembly to deviate from the optimal specifications.

In view of the foregoing or other problems, it is desirable in some applications to provide an athermal optical assembly (i.e., an optical assembly that generates output with substantial stability over a wide variation in temperature).

SUMMARY

This disclosure describes athermal optical assemblies, in other words, optical assemblies that generate output with substantial stability over a wide variation in temperature. The optical assemblies can be integrated, for example, as part of array generators arranged to project an array or other pattern of dots onto an object or projection plane.

For example, in one aspect, a hybrid optical assembly includes a first transmissive substrate and a second transmissive substrate separated from the first transmissive substrate. A first aspherical lens is on a first side of the first transmissive substrate, and a second hybrid diffractive/refractive lens is on a second side of the first transmissive substrate. Likewise, a third aspherical lens is on a first side of the second transmissive substrate, and a fourth aspherical lens is on a second side of the second transmissive substrate. The third aspherical lens faces the second hybrid diffractive/refractive lens. The output of the hybrid optical assembly exhibits substantial stability over a temperature range of 20° C.-100° C.

In another aspect, the hybrid optical assembly can be integrated into an optical pattern generator that includes an array of light emitting elements (e.g., VSCELs). The array of light emitting elements is disposed such that light generated by the light emitting elements passes through the fourth lens, the third lens, the second lens and the first lens of the hybrid optical assembly, in that order, so as to project a pattern of optical dots corresponding to the arrangement of the light emitting elements.

In accordance with another aspect, a method of generating a pattern of optical dots includes emitting light from a plurality of light emitting elements arranged in an array or other pattern. The emitted light is passed through a hybrid optical assembly comprising three aspherical lenses and a hybrid diffractive/refractive lens. The light that passes through the hybrid optical assembly is projected onto an object or plane and forms a pattern of dots.

Some implementations include one or more of the following features. For example, the first and second transmissive substrates of the hybrid optical assembly can be separated from one another by a distance in a range of 4 mm-10 mm. In some instances, the first and second transmissive substrates are composed of clear borosilicate glass and the first, second, third and fourth lenses are composed of epoxy. In some cases, the light emitting elements of the optical array generator are VCSELs.

Some implementations provide one or more of the following advantages. For example, in some cases, the quality of the projected dots can be relatively high over a wide temperature range (i.e., most of the optical energy for each dot is contained within a respective centroid having a relatively small radius, e.g., of about 3.5 μm or less for the range of 20° C. to 100° C.).

Other aspects, features and advantages will be readily apparent from the following detailed description, the accompanying drawings, and the claims.

DETAILED DESCRIPTION

The present disclosure describes hybrid athermal optical assemblies that can be integrated, for example, into array generators arranged to project an array or other pattern of dots. Optical pattern projection can be used in a variety of applications such as three-dimensional (3D) or depth mapping, area illumination, and LCD backlighting. 3D (or depth) mapping, for example, refers to a set of 3D coordinates representing the surface of an object. As part of the process of depth mapping, light (i.e., visible, infra-red, or other radiation) can be projected onto a region with a pattern of high quality (e.g., good resolution, and with dots of optimal encircled energy) and well-controlled intensity, so that depth values can be found reliably over a substantial part of an object or objects in a scene and over a range of operating temperatures (e.g., from 20° C. to 100° C.).

Figure 1:
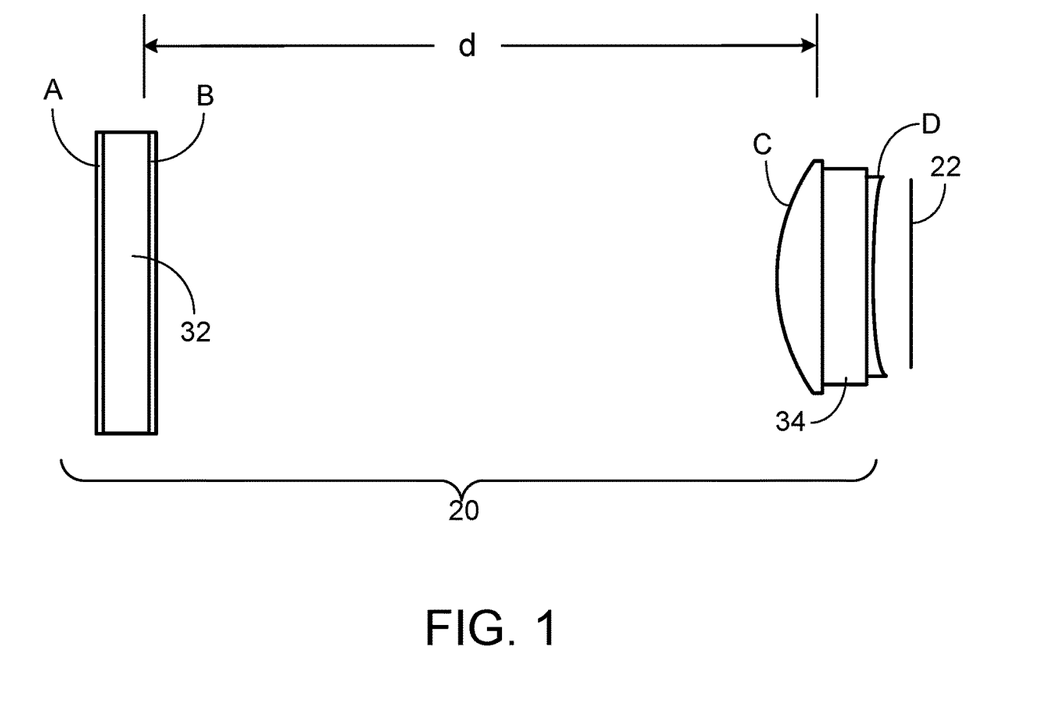
FIG. 1 illustrates an example of an optical array generator that includes an athermal optical assembly.

As shown in FIG. 1, a hybrid optical assembly 20 includes several passive optical elements, i.e., lenses A, B, C and D. Two of the lenses, A and B, are disposed on opposite sides of a first transmissive (e.g., glass or wafer) substrate 32; the other two lenses, C and D, are disposed on opposite sides of a second transmissive (e.g., glass or wafer) substrate 34. The optical axes of the lenses A, B, C and D are aligned with one another, and the inner surfaces of the lenses B and C are separated from one another by a distance d, which for some applications is in the range of several (e.g., four) millimeters (mm) to about ten mm. In some implementations, although the optical axes may be aligned, the geometric path may not be aligned; for example, in implementations having a folded optical path, the geometric path is not aligned, whereas the optical axes of the lenses A, B, C and D are aligned. An array 22 of light emitting elements, such as a VCSELs, can be placed in front of the optical assembly 20 such that lens D is closest to the VCSEL array 22 and the lens A is furthest from the VCSEL array 22. Such an implementation can be particularly advantageous is some cases because the overall footprint of the assembly can be reduced (i.e., by increasing its thickness—the dimension orthogonal to the footprint).

Figure 2:
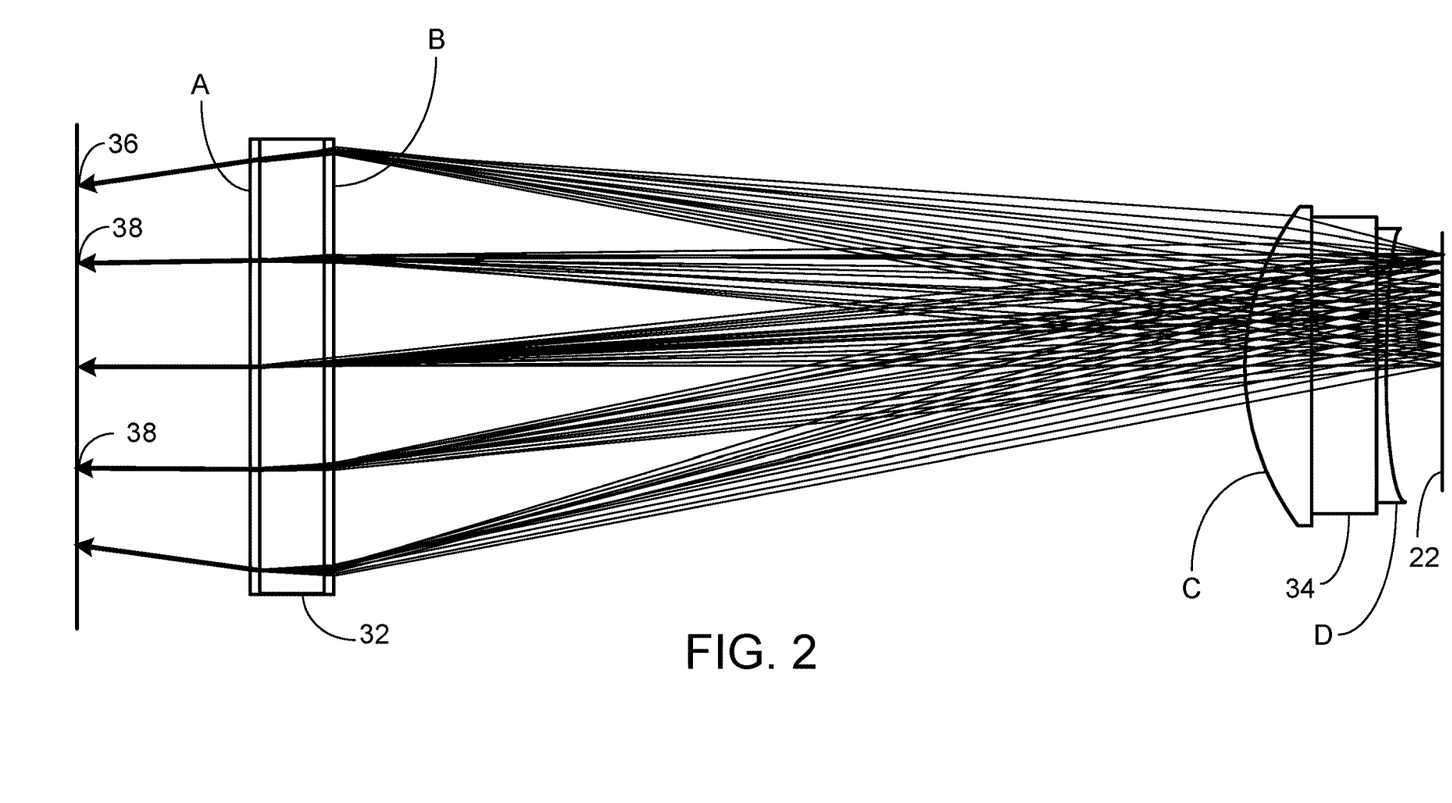
FIG. 2 illustrates an example of an array of optical dots projected onto a projection plane by the optical array generator of FIG. 1.

As illustrated in FIG. 2, the optical assembly 20 is arranged such that when light (e.g., IR light) from the VCSEL array 22 is emitted toward the optical assembly 20, an array of well-defined optical dots 38 appears on the projection plane 36. Collectively, the various lenses A, B, C and D help collimate and focus the light, such that the array of dots 38 appearing on the projection plane 26 corresponds, for example, to the arrangement of the VCSELs in the array 22. FIG. 2 illustrates a particular arrangement of the VCSEL array 22; other arrangements, and other numbers of VCSEL emitters within the array 22, can be provided for other implementations.

Figure 3:
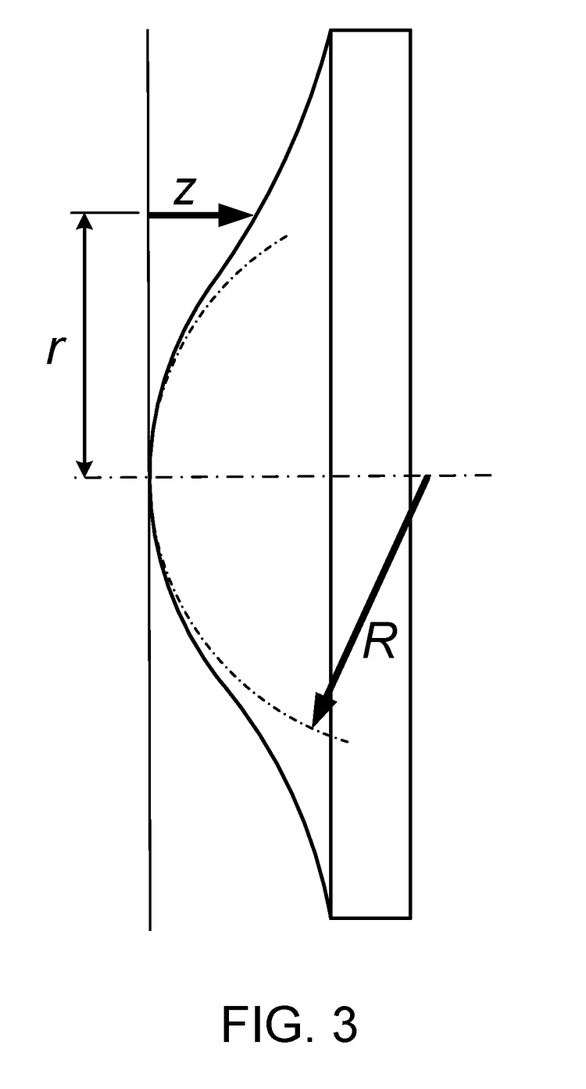
FIG. 3 illustrates an example of an aspheric lens.

In the illustrated example, lenses A, C and D are implemented as aspherical lenses. In general, aspheric lenses can be designed, for example, with surfaces of the form:

$$z(r) = \frac{r^2}{R\left(1 + \sqrt{1 - (1+\kappa)\frac{r^2}{R^2}}\right)} + \alpha_1 r^2 - \alpha_2 r^4 + \alpha_3 r^6 + \ldots,$$

where the optic axis is presumed to lie in the z-direction, and z(r) is the sag, i.e., the z-component of the displacement of the surface from the vertex, at distance r from the axis. The aspheric coefficients $\alpha_i$ describe the deviation of the surface from the axially symmetric quadric surface specified by R and $\kappa$. See FIG. 3. On the other hand, lens B is implemented as a hybrid diffractive/refractive lens. Lens B can be described using the aspheric equation above in combination with the following polynomial expansion describing the diffractive phase $\Phi$ of lens B:

$$\Phi = M \sum_{i=1}^{N} A_i \rho^{2i}$$

where M is the diffraction order of the hybrid diffractive/refractive lens, N is the number of polynomial coefficients in the series, $A_i$ is the coefficient on the $2i^{th}$ power of $\rho$, and $\rho$ is the normalized radial aperture coordinate. Specific examples of the lens characteristics and their respective properties for particular implementations are described below.

The specific properties of the lenses A through D are such that the optical assembly 20 is substantially athermal (i.e., its output exhibits substantial stability over a wide variation in temperature, for example, over the range 20° C. to 100° C.). Further, lenses (e.g., lenses A through D) also can provide for aberration correction.

Computer modeling was used to determine how different properties of the lenses and the optical assembly would vary with changes in temperature. Data describing implementations of hybrid optical assemblies are indicated in Tables I-VI, below. The dimensions (radius, thickness and diameter) associated with each surface based on the computer modeling is set forth in Table I and VI (in microns (μm)). Further surface coefficients describing the shapes of lens surfaces and the characteristics of the hybrid refractive/diffractive element B are described in Tables II and V. Different dimensions may be appropriate for other implementations, however. Further the example hybrid optical assemblies described below can be modeled or simulated by, for example, sequential and/or non-sequential ray-tracing simulation software such as Zemax, the numerals included below describe the various components (e.g., thicknesses, diameters, surface shapes, coefficients) and their position within the illumination assembly, these numerals include a plurality of decimal places. For example the aspheric coefficients used to describe the aspheric surfaces of various components below can include as many as nine decimals places or more. However, although up to nine decimals places are included, in some cases far fewer decimal places are needed to adequately describe the various components and their respective position within the illumination assembly. For example, in some cases no more than two or three or four decimal places are required in order to effectively describe various components and their respective position within the hybrid optical assembly further described below.

Multiple surfaces define the optical assembly 20, including the lenses A through D. Table I, below, describes the various surfaces in the optical assembly 20 and the VCSEL array 22 for some implementations with a total track length of about 4 mm.

TABLE I

| Surface ID | Type | Radius (mm) | Thickness (mm) | Glass | Diameter (mm) | Conic | Comment |
|---|---|---|---|---|---|---|---|
| OBJ | STANDARD | Infinity | 377.6232 | | 92.05419 | 0 | — |
| 1 | STANDARD | Infinity | 0.1321681 | | 1.385926 | 0 | — |
| 2 | STANDARD | Infinity | 0.01258744 | R14 | 1.365029 | 0 | — |
| STO | STANDARD | Infinity | 0.0314686 | | 1.287502 | 0 | — |
| 4 | EVENASPH | 26.0797 | 0.01236523 | R14 | 1.384618 | 0 | lens A |
| 6 | STANDARD | Infinity | 0.00629372 | R14 | 1.373109 | 0 | base layer |
| 7 | STANDARD | Infinity | 0.1888116 | D263TECO | 1.374508 | 0 | wafer AB |
| 8 | STANDARD | Infinity | 0.00629372 | R14 | 1.416216 | 0 | base layer |
| 9 | STANDARD | Infinity | 0.03689987 | R14 | 1.417614 | 0 | — |
| 10 | BINARY_2 | 8.06585 | 0 | | 1.384618 | 0 | lens B defined by |
| 12 | STANDARD | Infinity | 2.968914 | | 1.425223 | 0 | glass |

TABLE I-continued

| Surface ID | Type | Radius (mm) | Thickness (mm) | Glass | Diameter (mm) | Conic | Comment |
|---|---|---|---|---|---|---|---|
| 13 | EVENASPH | 0.95528 | 0.1888116 | R14 | 0.9911429 | 0 | lens C |
| 14 | STANDARD | Infinity | 0.00629372 | R14 | 0.9598653 | 0 | base layer |
| 15 | STANDARD | Infinity | 0.1888116 | D263TECO | 0.9568284 | 0 | wafer CD |
| 16 | STANDARD | Infinity | 0.00629372 | R14 | 0.8663031 | 0 | base layer |
| 17 | STANDARD | Infinity | 0.02517424 | R14 | 0.8532662 | 0 | — |
| 18 | EVENASPH | 2.22158 | 0.1888116 | | 0.8308089 | 0 | lens D |
| 19 | STANDARD | Infinity | 0 | | 0.7770572 | 0 | — |
| IMA | STANDARD | Infinity | N/A | | 0.7015326 | 0 | VCSEL array |

Thus, lens A is defined by surfaces 4 and 6; lens B is defined by surfaces 8, 9 and 10; lens C is defined by surfaces 13 and 14; and lens D is defined by surfaces 16, 17 and 18. Table II describes the various surface shapes, coefficients, and characteristics of the optical surfaces within the optical assembly 20 and the VCSEL array 22 for some implementations with a total track length of about 4 mm. In this implementation, the conic for each of the surfaces is zero. Further, although this implementation is described by an aspheric polynomial and a polynomial expansion describing the diffractive phase of lens B, other ways of describing the surfaces are within the scope of this disclosure.

TABLE II

| Surface ID | Surface type |
|---|---|
| OBJ | STANDARD |
| 1 | STANDARD |
| 2 | STANDARD |
| STO | STANDARD |
| 4 | EVENASPH |
| Coefficient on r^2 | 0 |
| Coefficient on r^4 | −0.10313738 |
| Coefficient on r^6 | 0 |
| Coefficient on r^8 | 0 |
| Coefficient on r^10 | 0 |
| Coefficient on r^12 | 0 |
| Coefficient on r^14 | 0 |
| Coefficient on r^16 | 0 |
| Aperture | Floating Aperture |
| Maximum Radius | 0.6923092 |
| 6 | STANDARD |
| 7 | STANDARD |
| 8 | STANDARD |
| 9 | STANDARD |
| 10 | BINARY_2 |
| Diffraction Order | 4 |
| Coefficient on r^2 | 0 |
| Coefficient on r^4 | −0.11494915 |
| Coefficient on r^6 | −0.85854795 |
| Coefficient on r^8 | 5.7044976 |
| Coefficient on r^10 | −17.848874 |
| Coefficient on r^12 | 28.092385 |
| Coefficient on r^14 | −17.554371 |
| Coefficient on r^16 | 0 |
| Maximum term # | 3 |
| Normalization Radius | 0.69230919 |
| Coefficient on p^2 | −525.28684 |
| Coefficient on p^4 | 71.54595 |
| Coefficient on p^6 | −30.983 |
| Aperture | Floating Aperture |
| Maximum Radius | 0.6923092 |
| 12 | STANDARD |
| 13 | EVENASPH |
| Coefficient on r^2 | 0 |
| Coefficient on r^4 | 0.11351174 |
| Coefficient on r^6 | 2.4017377 |
| Coefficient on r^8 | −41.190946 |
| Coefficient on r^10 | 324.91913 |
| Coefficient on r^12 | −1203.1116 |
| Coefficient on r^14 | 1694.4363 |
| Coefficient on r^16 | 0 |
| 14 | STANDARD |
| 15 | STANDARD |
| 16 | STANDARD |
| 17 | STANDARD |
| 18 | EVENASPH |
| Coefficient on r^2 | 0 |
| Coefficient on r^4 | 0.38189163 |
| Coefficient on r^6 | 3.5435835 |
| Coefficient on r^8 | −62.280573 |
| Coefficient on r^10 | 523.77256 |
| Coefficient on r^12 | −1930.264 |
| Coefficient on r^14 | 2348.243 |
| Coefficient on r^16 | 0 |
| 19 | STANDARD |
| IMA | STANDARD |

Table III, below, describes further information pertaining to the foregoing implementation.

TABLE III

| | |
|---|---|
| Number of Surfaces | 20 |
| Stop | 3 |
| System Aperture | Image Space F/# = 2.2 |
| Effective Focal Length | 2.832299 (in air at system temperature and pressure) |
| Effective Focal Length | 2.832299 (in image space) |
| Back Focal Length | 0.1514186 |
| Total Track | 3.999999 |
| Image Space F/#: | 2.2 |
| Paraxial Working F/# | 2.200017 |
| Working F/# | 2.20032 |
| Image Space NA | 0.2216194 |
| Object Space NA | 0.001704187 |
| Stop Radius | 0.6437044 |
| Paraxial Image Height | 0.3461546 |
| Paraxial Magnification | −0.007498492 |
| Entrance Pupil Diameter | 1.287409 |
| Entrance Pupil Position | 0.09568351 |
| Exit Pupil Diameter | 1214.659 |
| Exit Pupil Position | −2672.286 |
| Field Type | Real Image height in Millimeters |
| Maximum Radial Field | 0.3461546 |
| Primary Wavelength | 0.94 μm |
| Lens Units | Millimeters |
| Angular Magnification | 0.00105794 |

The foregoing information (i.e., in Tables I, II and III) is non-limiting and is provided as examples to enable a person of ordinary skill to make and use the invention.

Table IV, below, describes the various surfaces in the optical assembly 20 and the VCSEL array 22 for some implementations with a total track length of about 6.356 mm.

TABLE IV

| Surface ID | Type | Radius (mm) | Thickness (mm) | Glass | Diameter (mm) | Conic | Comment |
|---|---|---|---|---|---|---|---|
| OBJ | STANDARD | Infinity | 600 | | 92.05419 | 0 | — |
| 1 | STANDARD | Infinity | 0.21 | D263TECO | 1.385926 | 0 | — |
| 2 | STANDARD | Infinity | 0.02 | R14 | 1.365029 | 0 | — |
| STO | STANDARD | Infinity | 0.05 | | 1.287502 | 0 | — |
| 4 | EVENASPH | 41.4377 | 0.01964693 | R14 | 1.384618 | 0 | lens A |
| 6 | STANDARD | Infinity | 0.01 | R14 | 1.373109 | 0 | base layer |
| 7 | STANDARD | Infinity | 0.3 | D263TECO | 1.374508 | 0 | wafer AB |
| 8 | STANDARD | Infinity | 0.01 | R14 | 1.416216 | 0 | base layer |
| 9 | STANDARD | Infinity | 0.05862966 | R14 | 1.417614 | 0 | — |
| 10 | BINARY_2 | 12.8157 | 0 | | 1.384618 | 0 | lens B defined by glass |
| 12 | STANDARD | Infinity | 4.717264 | | 1.425223 | 0 | |
| 13 | EVENASPH | 1.51784 | 0.3 | R14 | 0.9911429 | 0 | lens C |
| 14 | STANDARD | Infinity | 0.01 | R14 | 0.9598653 | 0 | base layer |
| 15 | STANDARD | Infinity | 0.3 | D263TECO | 0.9568284 | 0 | wafer CD |
| 16 | STANDARD | Infinity | 0.01 | R14 | 0.8663031 | 0 | base layer |
| 17 | STANDARD | Infinity | 0.03999898 | R14 | 0.8632662 | 0 | — |
| 18 | EVENASPH | 3.52984 | 0.3 | | 0.8308089 | 0 | lens D |
| 19 | STANDARD | Infinity | 0 | | 0.7770572 | 0 | — |
| IMA | STANDARD | Infinity | N/A | | 0.7015326 | 0 | VCSEL array |

Thus, lens A is defined by surfaces 4 and 6; lens B is defined by surfaces 8, 9 and 10; lens C is defined by surfaces 13 and 14; and lens D is defined by surfaces 16, 17 and 18. Table V, below, describes the various surface shapes and characteristics of the optical surfaces within the optical assembly 20 and the VCSEL array 22 for some implementations with a total track length of about 6.356 mm. In this implementation, the conic for each of the surfaces is zero. Further, although this implementation is described by an aspheric polynomial and a polynomial expansion describing the diffractive phase of lens B, other ways of describing the surfaces are within the scope of this disclosure.

TABLE V

| Surface ID | Surface type |
|---|---|
| OBJ | STANDARD |
| 1 | STANDARD |
| 2 | STANDARD |
| STO | STANDARD |
| 4 | EVENASPH |
| Coefficient on $r^2$ | 0 |
| Coefficient on $r^4$ | −0.025712148 |
| Coefficient on $r^6$ | 0 |
| Coefficient on $r^8$ | 0 |
| Coefficient on $r^{10}$ | 0 |
| Coefficient on $r^{12}$ | 0 |
| Coefficient on $r^{14}$ | 0 |
| Coefficient on $r^{16}$ | 0 |
| Aperture | Floating |
| Maximum Radius | 1.1 |
| 6 | STANDARD |
| 7 | STANDARD |
| 8 | STANDARD |
| 9 | STANDARD |
| 10 | BINARY_2 |
| Diffraction Order | 4 |
| Coefficient on $r^2$ | 0 |
| Coefficient on $r^4$ | −0.02865682 |
| Coefficient on $r^6$ | −0.084781608 |
| Coefficient on $r^8$ | 0.22313584 |
| Coefficient on $r^{10}$ | −0.27655249 |
| Coefficient on $r^{12}$ | 0.17241308 |
| Coefficient on $r^{14}$ | −0.042675803 |
| Coefficient on $r^{16}$ | 0 |
| Maximum term # | 3 |
| Normalization Radius | 1.1 |
| Coefficient on $\rho^2$ | −834.62061 |
| Coefficient on $\rho^4$ | 113.67832 |

TABLE V-continued

| Surface ID | Surface type |
|---|---|
| Coefficient on $\rho^6$ | −49.228438 |
| Aperture | Floating |
| Maximum Radius | 1.1 |
| 12 | STANDARD |
| 13 | EVENASPH |
| Coefficient on $r^2$ | 0 |
| Coefficient on $r^4$ | 0.028298476 |
| Coefficient on $r^6$ | 0.23717158 |
| Coefficient on $r^8$ | −1.6112157 |
| Coefficient on $r^{10}$ | 5.0343342 |
| Coefficient on $r^{12}$ | −7.3839288 |
| Coefficient on $r^{14}$ | 4.1192835 |
| Coefficient on $r^{16}$ | 0 |
| 14 | STANDARD |
| 15 | STANDARD |
| 16 | STANDARD |
| 17 | STANDARD |
| 18 | EVENASPH |
| Coefficient on $r^2$ | 0 |
| Coefficient on $r^4$ | 0.095205578 |
| Coefficient on $r^6$ | 0.34992886 |
| Coefficient on $r^8$ | −2.4361528 |
| Coefficient on $r^{10}$ | 8.115392 |
| Coefficient on $r^{12}$ | −11.846725 |
| Coefficient on $r^{14}$ | 5.7087296 |
| Coefficient on $r^{16}$ | 0 |
| 19 | STANDARD |
| IMA | STANDARD |

Table VI, below, describes further information pertaining to the implementation described above.

TABLE VI

| | |
|---|---|
| Number of Surfaces | 20 |
| Stop | 3 |
| System Aperture | Image Space F/# = 2.2 |
| Effective Focal Length | 4.500199 (in air at system temperature and pressure) |
| Effective Focal Length | 4.500199 (in image space) |
| Back Focal Length | 0.2405868 |
| Total Track | 6.355539 |
| Image Space F/#: | 2.2 |
| Paraxial Working F/# | 2.200017 |
| Working F/# | 2.20032 |
| Image Space NA | 0.2216194 |
| Object Space NA | 0.001704187 |

TABLE VI-continued

| | |
|---|---|
| Stop Radius | 1.022773 |
| Paraxial Image Height | 0.55 |
| Paraxial Magnification | −0.007498492 |
| Entrance Pupil Diameter | 2.045545 |
| Entrance Pupil Position | 0.1520301 |
| Exit Pupil Diameter | 1932.099 |
| Exit Pupil Position | −4250.677 |
| Field Type | Real Image height in Millimeters |
| Maximum Radial Field | 0.55 |
| Primary Wavelength | 0.94 μm |
| Lens Units | Millimeters |
| Angular Magnification | 0.00105794 |

The foregoing information (i.e., in Tables IV, V and VI) is non-limiting and is provided as examples to enable a person of ordinary skill to make and use the invention Among the listed lens materials, D263TECO is a clear borosilicate glass of high chemical resistance, and R14 is an epoxy resin. Further properties of these materials are set forth in Table VII below. Other lens materials may be used for some implementations.

TABLE VII

| Material | Thermal coefficient of expansion (CTE) * 10E−6 | Index of refraction (at 20° C.) | Index of refraction (at 60° C.) | Index of refraction (at 100° C.) |
|---|---|---|---|---|
| R14 | 66.00000000 | 1.50454192 | 1.49980491 | 1.49505707 |
| D263TECO | 7.20000000 | 1.51365480 | 1.51370440 | 1.51374334 |

Figure 4:
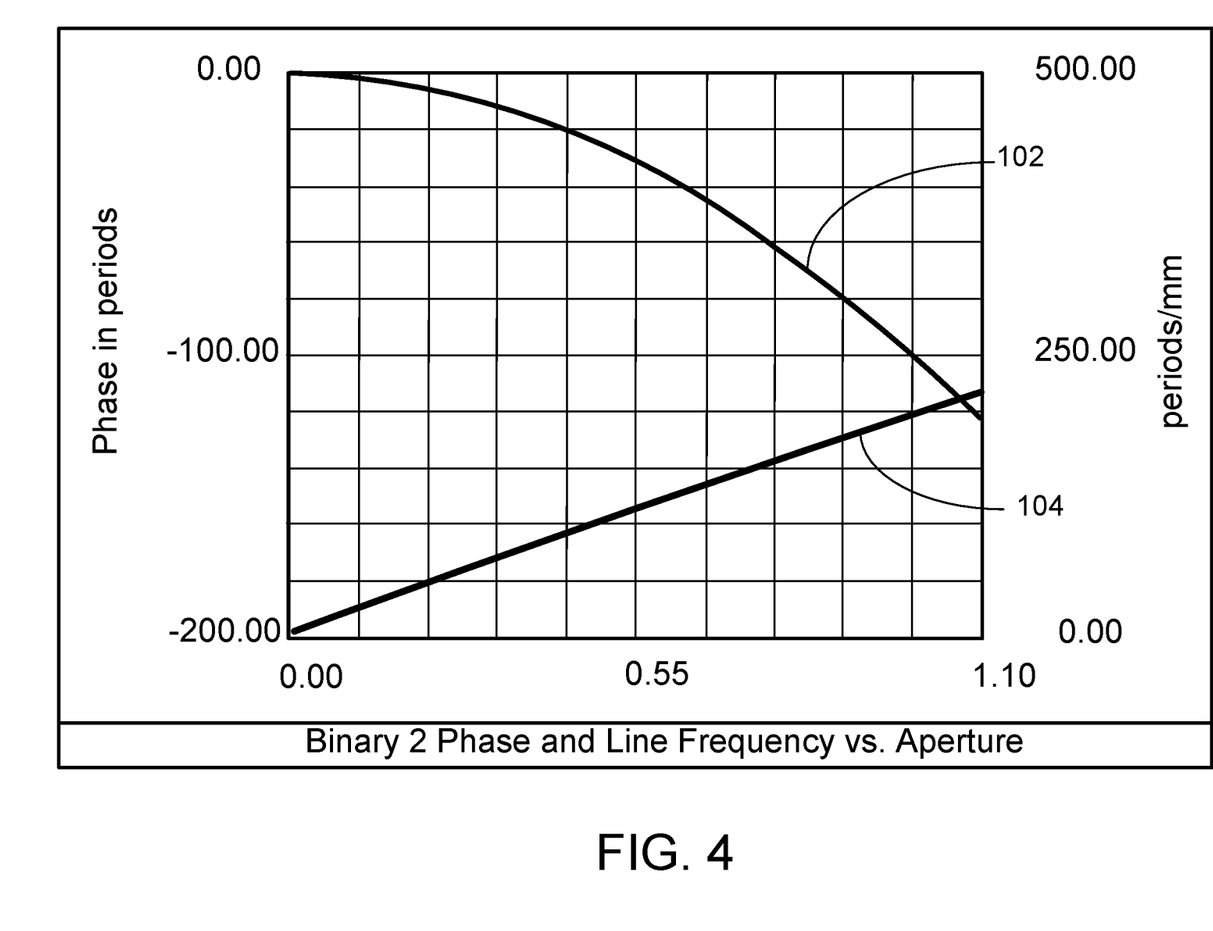
FIG. 4 illustrates properties of an example of a hybrid diffractive/refractive lens that can be included in the optical assembly.

For a particular implementation, the diffractive/refractive surface (i.e., Surface ID 10) of the hybrid lens B is can have characteristics as shown in FIG. 4, which indicates how phase and line frequency change with radius/distance from the center of the aperture. The curve 102 indicates the change in phase, whereas the curve 104 indicates the change in line frequency. Further, although the diffraction order of the hybrid diffractive/refractive surfaces described above is equal to four, in other implementations the diffraction order can be equal to one or another value. In general, the diffraction order may depend on the ease of manufacturing and/or the diameter of the hybrid diffractive/refractive lens B.

For the values of index of refraction, the computer modeling assumed that the index data is relative to air at the system temperature and pressure and that wavelengths are measured in air at the system temperature and pressure. For a wavelength of 0.940000 μm, the absolute air index values were 1.000270 at 20° C., 1.000237 at 60° C., and 1.000212 at 100° C.

The foregoing details are illustrative only, and various properties or parameters of one or more of the lenses and lens surfaces can be adjusted in other implementations so as to obtain a substantially athermal optical assembly. For example, some parameters of the described implementations can be additionally described in terms of effective-focal-length normalized parameters such as in Table 8 below:

TABLE VIII

| Surface ID | Type | Radius | Thickness | Glass | Diameter | Conic | Comment |
|---|---|---|---|---|---|---|---|
| OBJ | STANDARD | Infinity | 133.3274 | | 32.50158 | 0 | — |
| 1 | STANDARD | Infinity | 0.046665 | D263TECO | 0.489329 | 0 | — |
| 2 | STANDARD | Infinity | 0.004444 | R14 | 0.481951 | 0 | — |
| STO | STANDARD | Infinity | 0.011111 | | 0.454578 | 0 | — |
| 4 | EVENASPH | 9.20796 | 0.064366 | R14 | 0.488867 | 0 | lens A |
| 6 | STANDARD | Infinity | 0.002222 | R14 | 0.484804 | 0 | base layer |
| 7 | STANDARD | Infinity | 0.066664 | D263TECO | 0.485298 | 0 | wafer AB |
| 8 | STANDARD | Infinity | 0.002222 | R14 | 0.500023 | 0 | base layer |
| 9 | STANDARD | Infinity | 0.013028 | R14 | 0.500517 | 0 | — |
| 10 | BINARY_2 | 2.84781 | 0 | | 0.488867 | 0 | lens B defined by glass |
| 12 | STANDARD | Infinity | 1.048235 | | 0.503204 | 0 | |
| 13 | EVENASPH | 0.33728 | 0.066664 | R14 | 0.349943 | 0 | lens C |
| 14 | STANDARD | Infinity | 0.002222 | R14 | 0.3389 | 0 | base layer |
| 15 | STANDARD | Infinity | 0.066664 | D263TECO | 0.337827 | 0 | wafer CD |
| 16 | STANDARD | Infinity | 0.002222 | R14 | 0.305866 | 0 | base layer |
| 17 | STANDARD | Infinity | 0.008888 | R14 | 0.304793 | 0 | — |
| 18 | EVENASPH | 0.78437 | 0.066664 | | 0.293334 | 0 | lens D |
| 19 | STANDARD | Infinity | 0 | | 0.274356 | 0 | — |
| IMA | STANDARD | Infinity | 0 | | 0.24769 | 0 | VCSEL array |

The described implementations can be additionally described in terms of an aspect ratio where the aspect ratio is defined as the largest diameter optical surface divided by the total track length of the hybrid optical assembly. For example, in some implementations the aspect ratio of the hybrid optical assembly can be 0.5, while in other implementations that aspect ratio can be larger or smaller depending on the intended application of the hybrid optical assembly. For example, for some implementations with a total track length about 4 mm, the aspect ratio can be about 0.356, while for some other implementations with a total track length of about 6.356 the aspect ratio can be about 0.224.

Figure 5A:
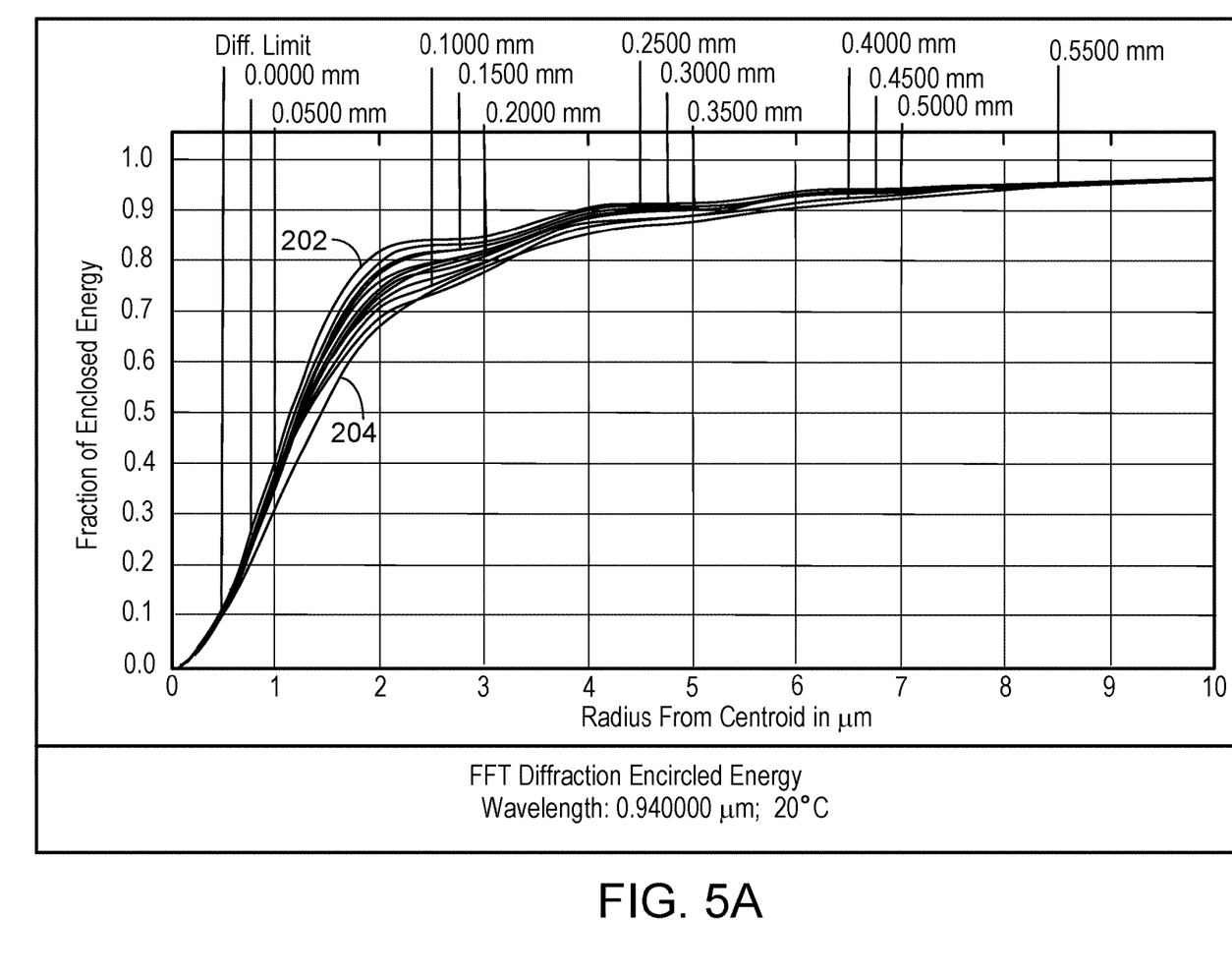
FIGS. 5A, 5B and 5C are graphs illustrating performance of the optical assembly at different temperatures.
Figure 5B:
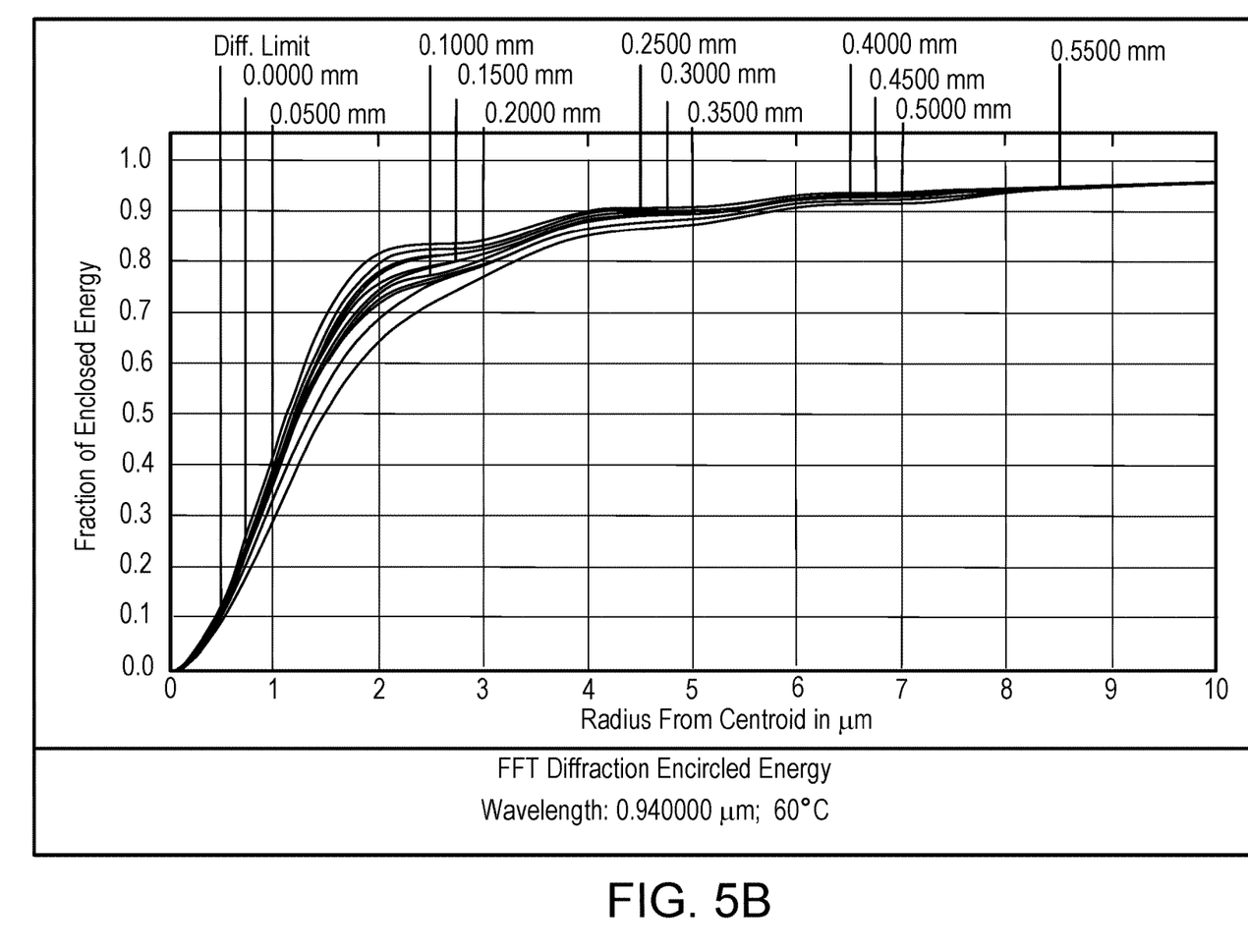
Figure 5C:
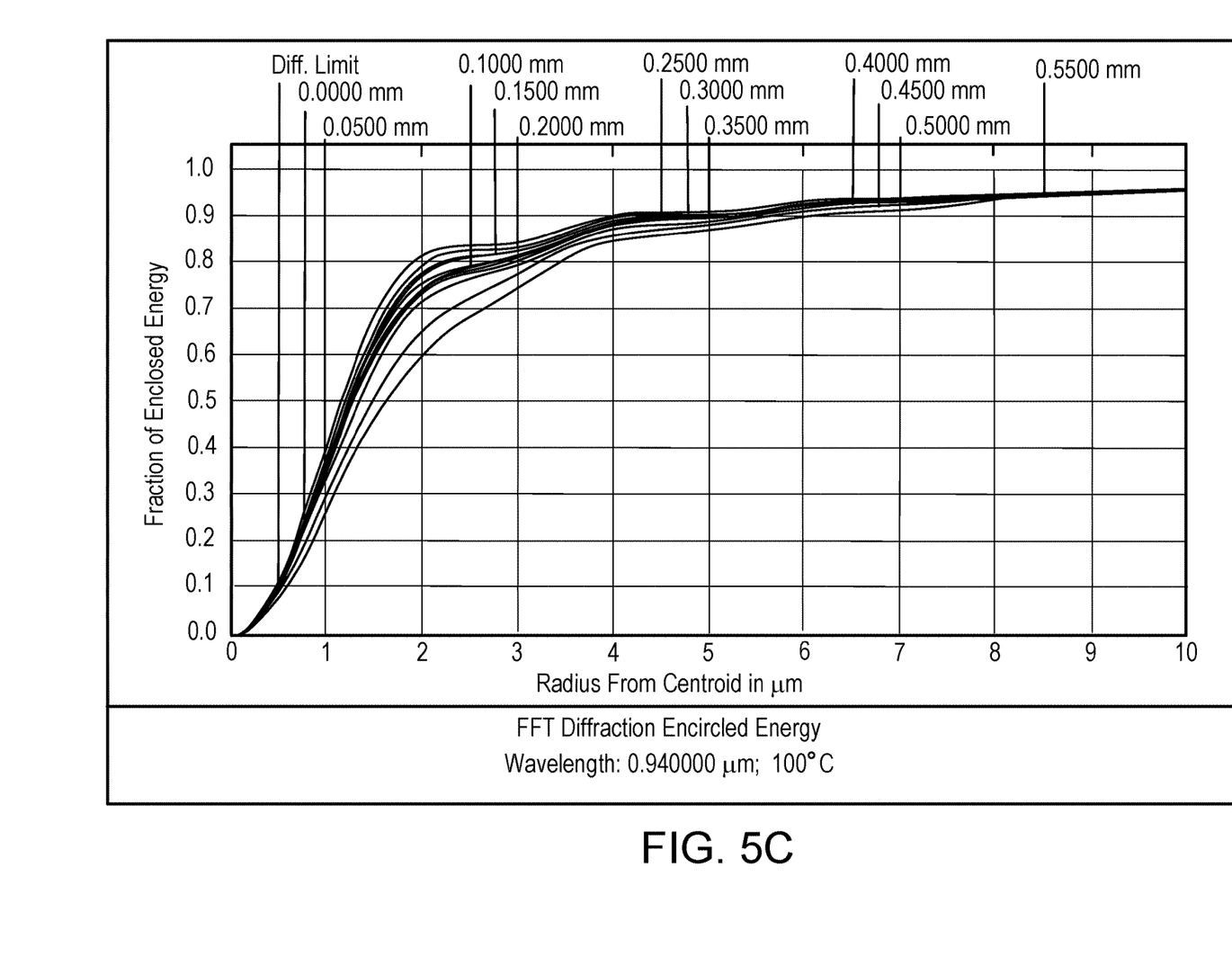

As indicated previously, the optical assembly 22 can be integrated as part of an optical pattern generator arranged to project an array or other pattern of dots onto a projection plane 36. As illustrated in the graphs of FIGS. 5A, 5B and 5C based on computer modeling, the optical assembly 22 can be used to project a high-quality array of dots onto the projection plane. In FIGS. 5A-5C, each curve (e.g., 202, 204) represents a different field point, for example, a projected dot from the VCSEL array 22. The values above the top of the graph (i.e., 0.000 mm-0.550 mm) indicate the distance of each field point from the center of the VCSEL array plane. FIG. 5A illustrates the curves at 20° C., FIG. 5B illustrates the curves at 60° C., and FIG. 5C illustrates the curves at 100° C.

Each curve in FIGS. 5A-5C indicates the fraction of the optical energy enclosed within a centroid having a given radius from the center of the dot projected onto the plane 36. The steepness of the slopes of the curves out to a radius of about 3.5 µm is indicative of the high quality of the projected dots (i.e., most of the optical energy for each dot is contained within a centroid having a radius of about 3.5 µm). Further, the high quality of the projected array of dots substantially is maintained over the temperature range of 20° C.-100° C. That is, at an operating temperature of about 20° C.-60° C., about 80% of light is enclosed in a circle (a dot) with a radius slightly less than about 3.4 µm for all possible light source (VCSEL) positions, whereas up to an operating temperature of about 100° C., about 80% of light is enclosed in a circle with a radius slightly less than about 3.5 µm for all possible light source (VCSEL) positions. Accordingly, the quality of the output of the athermal optical assembly 20 is substantially constant over the operating range 20° C. to 100° C. Thus, high quality system performance can be achieved even as the temperature varies.

Various modifications and combinations of features will be evident from the foregoing examples and are within the spirit of the invention. Accordingly, other implementations are within the scope of the claims.

What is claimed is:

1. A hybrid optical assembly comprising:
a first transmissive substrate;
a first aspherical lens on a first side of the first transmissive substrate;
a second hybrid diffractive/refractive lens on a second side of the first transmissive substrate;
a second transmissive substrate separated from the first transmissive substrate;
a third aspherical lens on a first side of the second transmissive substrate; and
a fourth aspherical lens on a second side of the second transmissive substrate;
wherein the third aspherical lens faces the second hybrid diffractive/refractive lens,
wherein the output of the hybrid optical assembly exhibits substantial stability over a temperature range of 20° C.-100° C., and
wherein the first and second transmissive substrates are separated from one another by a distance in a range of 4 mm-10 mm.

2. The hybrid optical assembly of claim 1, further comprising an array of light emitting elements, wherein the light emitting elements are vertical cavity surface-emitting lasers (VCSELs).

3. The hybrid optical assembly according to claim 1, wherein the first aspheric lens, the second hybrid diffractive/refractive lens, the third aspheric lens, and the fourth aspheric lens have focal-length-normalized diameters of 0.49, 0.49, 0.35, and 0.29, respectively.

4. The hybrid optical assembly according to claim 1, wherein the first aspheric lens, the second hybrid diffractive/refractive lens, the third aspheric lens, and the fourth aspheric lens have focal-length-normalized thicknesses of 0.0044, 1.048, 0.067, and 0.067, respectively.

5. The hybrid optical assembly according to claim 1, wherein the first aspheric lens has a focal-length-normalized curvature of 9.21, the second hybrid diffractive/refractive lens has a focal-length-normalized curvature of 2.85, the third aspheric lens has a focal-length-normalized curvature of 0.34, and the fourth aspheric lens has a focal-length-normalized curvature of 0.78.

6. The hybrid optical assembly according to claim 5 having an aspect ratio of 0.356.

7. The hybrid optical assembly according to claim 5, the first, third and fourth aspherical lenses have the following coefficients, respectively:

| Coefficient (r) | $1^{st}$ aspheric lens | $3^{rd}$ aspheric lens | $4^{th}$ aspheric lens |
|---|---|---|---|
| Fourth-order | −0.103 | 0.114 | 0.382 |
| Sixth-order | 0 | 2.4032 | 3.544 |
| Eighth-order | 0 | −41.19 | −62.281 |
| Tenth-order | 0 | 324.92 | 523.773 |
| Twelfth-order | 0 | −1203.11 | −1930.264 |
| Fourteenth-order | 0 | 1694.44 | 2348.243 | and wherein the second hybrid diffractive/refractive lens has the following coefficients:

| Coefficient (□) | $2^{nd}$ hybrid diffractive/refractive lens |
|---|---|
| Aspheric Fourth-order | −0.115 |
| Aspheric Sixth-order | −0.859 |
| Aspheric Eighth-order | 5.705 |
| Aspheric Tenth-order | −17.849 |
| Aspheric Twelfth-order | 28.092 |
| Aspheric Fourteenth-order | −17.554 |
| Diffractive-phase Second-order | −525.287 |
| Diffractive-phase Fourth-order | 71.546 |
| Diffractive-phase Sixth-order | −30.983. |

8. The hybrid optical assembly according to claim 5 having an aspect ratio of 0.224.

9. The hybrid optical assembly according to claim 5, wherein the first, third and fourth aspheric lenses have the following coefficients, respectively:

| Coefficient (r) | $1^{st}$ aspheric lens | $3^{rd}$ aspheric lens | $4^{th}$ aspheric lens |
|---|---|---|---|
| Fourth-order | −0.026 | 0.028 | 0.095 |
| Sixth-order | 0 | 0.237 | 0.350 |
| Eighth-order | 0 | −1.611 | −2.436 |
| Tenth-order | 0 | 5.034 | 8.115 |
| Twelfth-order | 0 | −7.384 | −11.847 |
| Fourteenth-order | 0 | 4.119 | 5.709 | and wherein the second hybrid diffractive/refractive lens has the following coefficients:

| Coefficient (□) | $2^{nd}$ hybrid diffractive/refractive lens |
|---|---|
| Aspheric Fourth-order | −0.027 |
| Aspheric Sixth-order | −0.085 |
| Aspheric Eighth-order | 0.223 |
| Aspheric Tenth-order | −0.277 |
| Aspheric Twelfth-order | 0.172 |
| Aspheric Fourteenth-order | −0.043 |
| Diffractive-phase Second-order | −834.621 |
| Diffractive-phase Fourth-order | 113.678 |
| Diffractive-phase Sixth-order | −49.228. |

10. A hybrid optical assembly comprising:
a first transmissive substrate;
a first aspherical lens on a first side of the first transmissive substrate;
a second hybrid diffractive/refractive lens on a second side of the first transmissive substrate;
a second transmissive substrate separated from the first transmissive substrate;
a third aspherical lens on a first side of the second transmissive substrate;
a fourth aspherical lens on a second side of the second transmissive substrate; and
an array of light emitting elements, wherein the light emitting elements are vertical cavity surface-emitting lasers (VCSELs);
wherein the third aspherical lens faces the second hybrid diffractive/refractive lens,
wherein the output of the hybrid optical assembly exhibits substantial stability over a temperature range of 20° C.-100° C., and
wherein the first and second transmissive substrates are composed of clear borosilicate glass and the first, second, third and fourth lenses are composed of epoxy.

11. An optical pattern generator comprising:
an array of light emitting elements; and
a hybrid optical assembly including
a first transmissive substrate,
a first aspherical lens on a first side of the first transmissive substrate,
a second hybrid diffractive/refractive lens on a second side of the first transmissive substrate,
a second transmissive substrate separated from the first transmissive substrate,
a third aspherical lens on a first side of the second transmissive substrate, and
a fourth aspherical lens on a second side of the second transmissive substrate,
wherein the third aspherical lens faces the second hybrid diffractive/refractive lens, and
wherein the output of the hybrid optical assembly exhibits substantial stability over a temperature range of 20° C.-100° C.; and
wherein the array of light emitting elements is disposed such that light generated by the light emitting elements passes through the fourth lens, the third lens, the second lens and the first lens of the hybrid optical assembly, in that order, so as to project a pattern of optical dots corresponding to the arrangement of the light emitting elements.

12. The optical array generator of claim 11 wherein the light emitting elements are vertical cavity surface-emitting lasers (VCSELs).

\* \* \* \* \*